US007515322B2

United States Patent
Suga

(10) Patent No.: US 7,515,322 B2
(45) Date of Patent: Apr. 7, 2009

(54) BEAM SCANNING DEVICE WITH LIGHT BLOCKING MEMBER

(75) Inventor: Tomoaki Suga, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 191 days.

(21) Appl. No.: 11/220,604

(22) Filed: Sep. 8, 2005

(65) Prior Publication Data

US 2006/0055996 A1    Mar. 16, 2006

(30) Foreign Application Priority Data

Sep. 13, 2004  (JP) .............................. 2004-264786
Aug. 9, 2005   (JP) .............................. 2005-230260

(51) Int. Cl.
*G02B 26/08* (2006.01)
*B41J 27/00* (2006.01)

(52) U.S. Cl. ...................................... 359/206; 347/259

(58) Field of Classification Search ................. 359/201, 359/204, 205, 206, 210, 662
See application file for complete search history.

(56) References Cited

U.S. PATENT DOCUMENTS 5,245,481 A * 9/1993 Kaneko et al. .............. 359/896
5,850,306 A * 12/1998 Fukutome et al. ........... 359/204
6,700,596 B2 * 3/2004 Ishihara ...................... 347/134
7,072,087 B2 * 7/2006 Nakahata .................... 359/204
7,184,185 B2 * 2/2007 Tamaru et al. .............. 359/204
2004/0100673 A1 * 5/2004 Sakai et al. ................. 359/216
2004/0130800 A1 * 7/2004 Honda ........................ 359/668
2005/0062836 A1 * 3/2005 Nakajima ................... 347/225

FOREIGN PATENT DOCUMENTS

| JP | 2002-196269 | 7/2002 |
| JP | 2003-255254 | 9/2003 |
| JP | 2004-29671  | 1/2004 |

* cited by examiner

*Primary Examiner*—Arnel C Lavarias
*Assistant Examiner*—Jade Callaway
(74) *Attorney, Agent, or Firm*—Oblon, Spivak, McClelland, Maier & Neustadt, P.C.

(57) ABSTRACT

A beam scanning device includes a light source to emit a light beam, an optical deflector to deflect the light beam, and an optical system including a fθ lens to guide the defected light beam to a scan surface to form an image thereon. The beam scanning device also includes a synchronization detecting sensor to detect the deflected light beam outside an area of the image, a light blocking member configured to block the deflected light beam on an exit side of the fθ lens outside an effective scan area that includes the area of the image and also includes an optical path extending to the synchronization detecting sensor. The beam scanning device further includes a metal housing accommodating the light source, the optical deflector, the optical system, the light blocking member, and the synchronization detecting sensor.

18 Claims, 10 Drawing Sheets

BEAM SCANNING DEVICE WITH LIGHT BLOCKING MEMBER

CROSS-REFERENCE TO RELATED APPLICATIONS

The present application is based on Japanese priority applications No. 2004-264786 filed on Sep. 13, 2004 and No. 2005-230260 filed on Aug. 9, 2005, with the Japanese Patent Office, the entire contents of which are hereby incorporated by reference.

BACKGROUND OF THE INVENTION

1. Field of the Invention

The present invention generally relates to a beam scanning device and an image forming apparatus.

2. Description of the Related Art

General types of image forming apparatuses such as multifunction peripherals having the combined functions of printer/copier/facsimile device may include color image forming apparatuses, for example. Such color image forming apparatuses shine laser beams emitted from a plurality of light sources on four image carriers (e.g., photoconductive drums) arranged in parallel so as to create latent images. The latent images formed on the image carriers are developed with developers (e.g., yellow, magenta, cyan, black toners) for visualization. A transfer material such as a print paper sheet carried on a transfer conveyer belt passes successively through a series of transfer units corresponding to the respective image carriers. The visualized images in the respective colors formed on the respective image carriers are transferred one over another onto the transfer material. The image transferred onto the transfer material is then fused to create a color image.

A beam scanning device (optical writing unit) used in such color image forming apparatuses may include a plurality of light sources, a beam deflecting means to deflect the light beams emitted from the plurality of light sources in two directions symmetrically, and an optical system that is arranged symmetrically on the two sides of the beam deflecting means to guide and focus the light beams on the respective scan surfaces as the light beams are deflected and scanned by the beam deflecting means. Patent Document 1 discloses an optical housing that includes the plurality of light sources, the beam deflecting means, and the optical system.

[Patent Document 1] Japanese Patent Application Publication No. 2002-196269

The optical writing unit described in Patent Document 1 is provided with a light blocking member for blocking reflected/scattered light (flare light) coming from the opposing optical system as the optical systems are arranged on the two sides of the beam deflecting means. Such light blocking member is located around the beam deflecting means inside the housing, and is situated outside the area where the light beams is deflected and scanned by the beam deflecting means.

Such light blocking member for blocking reflected/scattered light (flare light) coming from an optical system is also disclosed in Patent Document 2 and Patent Document 3. Patent Document 2 discloses an image forming apparatus in which a light blocking member is provided at one or more locations of the deflecting unit so as to block a portion of a light beam from a light source as the portion does not contribute to the formation of an image. Patent Document 3 is directed to a multi-beam scanning optical system. There is a need to prevent ghost light reflected by each reflective surface of the polygon mirror from entering the optical path of a correct light beam. Such ghost light is reflected on the adjacent surface of the polygon mirror after coming back along a path parallel to the optical axis of an fθ lens (scan lens). A light blocking plate having a rectangular shape perpendicular to the optical axis of the fθ lens (scan lens) is provided such as to have its tip located in a space enclosed by the optical path of the reflected ghost light and the outline of the scan area of the correct light beam at the scan end opposite the side where the laser beam enters, thereby blocking light outside the scan area of the correct light beam.

[Patent Document 2] Japanese Patent Application Publication No. 2003-255254

[Patent Document 3] Japanese Patent Application Publication No. 2004-29671

Further, Patent Document 4 discloses a scan focus optical system receiving a corresponding deflected light beam incident thereto which is provided on the two sides of the rotating polygon mirror such as to form optical axes substantially parallel to each other. A light blocking means is provided to prevent the reflected errant light coming from one of the two scan focus optical systems from entering the other one of the two scan focus optical systems. This light blocking means blocks the light coming from one of the scan focus optical systems outside the housing of the rotating polygon mirror for the sake of the other one of the scan focus optical systems.

[Patent Document 4] Japanese Patent 3566474

Patent Document 5 is directed to interference between a lens edge and the optical path of a laser beam (incident light) traveling from the optical source unit to the rotating polygon mirror where such interference occurs when the focusing lens system is arranged near the rotating polygon mirror due to the miniaturization of the optical housing or the like. The disclosed scanning optical apparatus avoids such interference with respect to the optical path of the incident light by providing a cut by removing an edge portion of the lens.

[Patent Document 5] Japanese Patent Application Publication No. 2000-267036

In the following, an example of the related-art beam scanning devices will be described with reference to FIG. 11.

In the illustrated beam scanning device, four light sources 101K, 101M, 101C, and 101Y, corresponding to four respective image carriers (black K, magenta M, cyan C, and yellow Y), emit light beams, which are then deflected and scanned by a beam deflector 102 so as to form two pairs of deflective scans on the two respective right/left-hand sides, each pair being comprised of an upper part and a lower part. An fθ lens 103R and fθ lens 103L, which are arranged on the two respective sides, perform fθ correction so as to turn a constant angular velocity scan by the beam deflector 102 into a constant velocity scan on the image carrier surfaces. The light beams of the two pairs scanned in the upper part and lower part are reflected and separated by return mirrors 104Y, 104C, 104M, and 104K for provision to the respective image carrier. Surface-tilt correction lenses 105Y, 105C, 105M, and 105K serve to ensure that the lengths of the optical paths extending to the image carriers become equal to each other.

Further, synchronization detecting sensors 106Y, 106C, 106M, and 106K are provided outside the imaging area on the upstream side of the scan in one-to-one correspondence to the four scans. The synchronization detecting sensors 106Y, 106C, 106M, and 106K serve to synchronize the turn-on timing of the light sources 101Y, 101C, 101M, and 101K, respectively.

The light sources 101Y, 101C, 101M, and 101K, the beam deflector 102, the fθ lenses 103R and 103L, the surface-tilt correction lenses 105Y, 105C, 105M, and 105K, the return mirrors 104Y, 104C, 104M, and 104K, and the synchronization detecting sensors 106Y, 106C, 160M, and 106K are accommodated in an optical housing 110.

The synchronization detecting paths directed toward the synchronization detecting sensors pass through the effective scan area of the lenses, and reach the synchronization detecting sensors with a predetermined beam diameter and power. The light sources are lit up before reaching the synchronization detecting sensors so as to ensure that the light beams are received and detected by the sensors even if the installed positions of the synchronization detecting sensors are not aligned.

In recent years, higher image quality has been pursued. Due to this, control to achieve a constant power of the light sources inside the scan area is performed before the light beams reach the synchronization detecting sensors. Some image forming apparatuses require a time allotted for such control.

In image forming apparatuses, costly lenses may be replaced with general-purpose lenses so as to allow the sharing of these lenses between different apparatuses, thereby reducing the size and cost. Because of this, the effective scan areas of the lenses are set to a required minimum Further, the time required for synchronization-purpose pre-lighting is determined according to the control circuit and the light sources such as LDs. In the beam scanning devices for providing high-speed scans as used in high-speed image forming apparatuses, a scan area scanned per constant time period increases, resulting in a need for an increase in the area of the synchronization-purpose pre-lighting.

As a result, the synchronization-purpose pre-lit light L1 and L2 (see FIG. 11) falls outside the effective lens area. If there is a discontinuous surface outside the effective lens area, the flare light of such a discontinuous surface may enter the imaging area on the image carriers, resulting in the problem of an abnormal image.

A plastic lens made through plastic molding may be used as an fθ lens for the purpose of cost reduction. When plastic molding is used, it is typical to pour a resin in the longitudinal direction of the lens due to reasons associated with the use of plastic molding. Since the shape of the inlet (gate) through which the resin is poured is different from the shape of the lens, the resulting lens inevitably has a portion with foreign shape. A discontinuous surface is thus created at the boundary between the lens surface and the portion having foreign shape outside the effective lens area. This gives rise to the problem that the flare light of the discontinuous surface enters the imaging area on the image carriers to create an abnormal image.

In high-speed machines (image forming apparatuses), further, the beam deflector may be required to have a good heat releasing performance with respect to the generated heat and a good anti-vibration performance against vibration caused by external disturbance. In such a case, the optical housing for accommodating the light sources and the beam deflector is implemented as a metal optical housing rather than as a resin optical housing.

In general, metal-molded products are not shaped well compared with resin-molded products, and it is difficult to create a product having thin thickness. Further, if positional accuracy is required, an additional step of cutting and scraping may be necessary. Moreover, a metal surface has a relatively higher reflectivity compared with a resin surface. If a rib formed as part of the optical housing for the purpose of blocking flare light, thus, reflection occurs on the surface of the rib, resulting in the reflective light entering the imaging area.

Accordingly, there is a need for a beam scanning device which can block flare light with sufficient accuracy so as to prevent a drop in image quality while using a metal housing to ensure good heat releasing performance and anti-vibration performance. Further, there is a need for an image forming apparatus provided with such a beam scanning device.

SUMMARY OF THE INVENTION

It is a general object of the present invention to provide a beam scanning device and image forming apparatus that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a beam scanning device and image forming apparatus particularly pointed out in the specification in such full, clear, concise, and exact terms as to enable a person having ordinary skill in the art to practice the invention.

To achieve these and other advantages in accordance with the purpose of the invention, the invention provides a light blocking member configured to block a deflected light beam on an exit side of the fθ lens outside an effective scan area that includes an optical path extending to the synchronization detecting sensor.

According to at least one embodiment of the present invention, with the provision of the light blocking member, it is possible to block the flare light of synchronization-purpose pre-lit light with sufficient accuracy despite the use of the metal optical housing. This prevents image quality from degrading due to the flare light while ensuring good heat releasing performance and anti-vibration performance.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
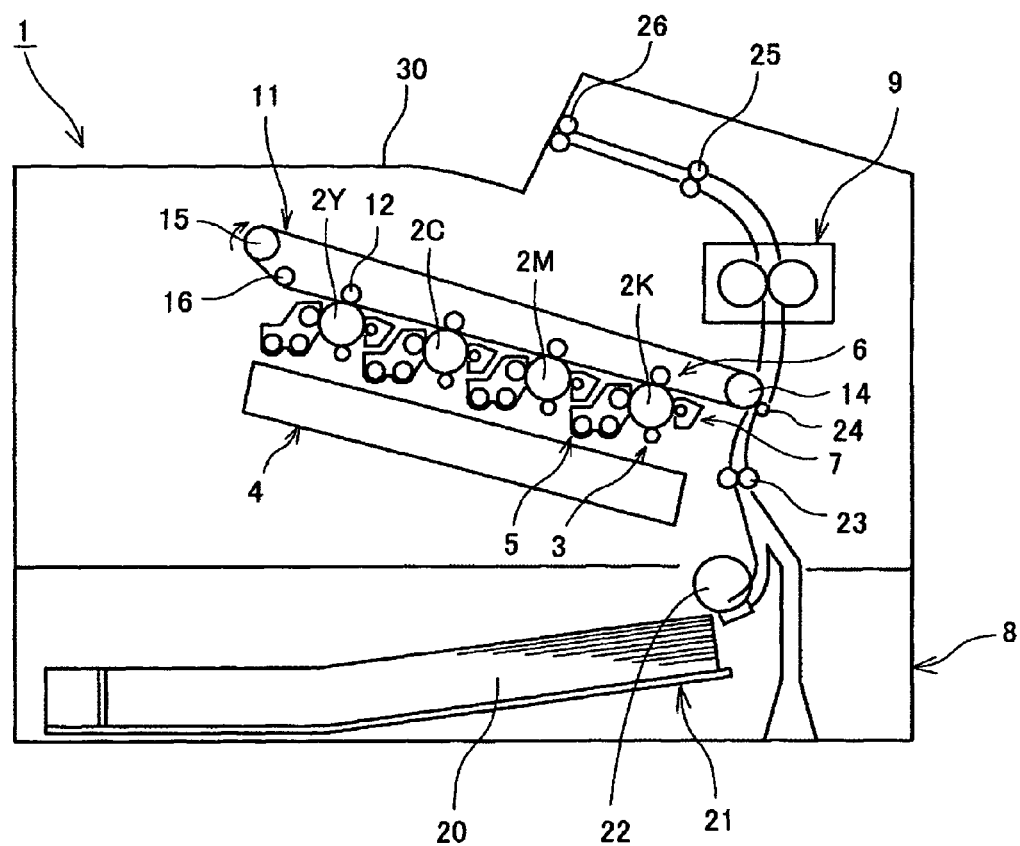
FIG. 1 is a drawing showing an example of an image forming apparatus which includes a beam scanning device according to the present invention.

In the following, embodiments of the present invention will be described with reference to the accompanying drawings.

First, an outline of an example of an image forming apparatus according to the present invention will be described with reference to FIG. 1.

The illustrated image forming apparatus serves to create an image through an image forming process based on electrophotography, and includes, inside an apparatus case 1, a plurality of photoconductive drums 2Y, 2C, 2M, and 2K serving as image carriers, a charging unit 3 for charging each of the photoconductive drums, a beam scanning device (optical writing unit) 4 serving as a light exposure means to form an electrostatic latent image on each of the photoconductive drums, a developer unit 5 for developing the latent image on each of the photoconductive drums, a transfer unit 6 for transferring a toner image formed on each of the photoconductive drums to an intermediate transfer member (belt) 11, and a cleaning unit 7 for removing residual toner and electric charge from each of the photoconductive drums. Further, a sheet feeder unit 8 is provided at the bottom of the apparatus case 1 to supply sheets 20. Moreover, a fuser unit 9 is provided to fuse the toner image transferred onto the sheets 20.

In this image forming apparatus, images are formed in four colors, i.e., yellow Y, cyan C, magenta M, and black K from left in FIG. 1 (from the upstream side of the rotation of the intermediate transfer belt 11). These images are then superimposed one over another on the intermediate transfer belt 11 to create a full-color image. It should be noted that the creation of a full-color image is possible based solely on yellow Y, cyan C and magenta M without use of black.

The charging unit 3 is comprised of a conductive roller having a roller shape. A power supply device supplies a charging bias voltage to this roller so as to create uniform electric charge in the photoconductive layer on the surface of each photoconductive drum. The beam scanning device 4 shines a laser beam on the surface of each photoconductive drum while the laser beam is turned on/off in response to image data, thereby to form an electrostatic latent image responsive to the intended image on each photoconductive drum. The developer unit 5 is comprised of a developer roller, a developing agent accommodating case, etc., and visualizes the latent image on each of the photoconductive drums.

The transfer unit 6 transfers the visualized toner image from each photoconductive drum to the intermediate transfer belt 11 serving as an intermediate transfer member by use of a transfer roller 12. The intermediate transfer belt 11 is suspended between a drive roller 14, a follower roller 15, and a tension roller 16. A drive motor (not shown) rotates the drive roller 14 so as to rotate the intermediate transfer belt 11 in the direction indicated by an arrow. The toner image formed on each of the photoconductive drums comes in contact with the intermediate transfer belt 11. When a predetermined bias voltage is applied to the transfer roller 12 situated on the backside of the intermediate transfer belt 11, the toner image is transferred onto the intermediate transfer belt 11 (which is referred to as "first transfer").

The cleaning unit 7 removes residual developing agent and electric charge from each photoconductive drum after the image transfer onto the intermediate transfer belt 11. Such removal is performed prior to the next imaging operation.

The sheets 20, which serve as a transfer material and are accommodated in a sheet feeder cassette 21 of the sheet feeder unit 8, are separated one by one to be slid out by a feed roller 22. The sheet 20 is then carried by resist rollers 23 to be supplied to a transfer roller 24 serving as a second transfer means. The full-color toner image superimposed on the intermediate transfer belt 11 is then transferred onto the sheet 20 (which is referred to as "secondary transfer").

The sheet 20 is then carried to the fuser unit 9 for the purpose of fusing the image. The fuser unit 9 applies heat and pressure to fuse (fix) the image. Thereafter, the sheet 20 passes through conveyor rollers 25, and are ejected by sheet ejecting rollers 26 onto a paper ejection tray 30 provided on the exterior of the apparatus.

The image forming apparatus described above uses an intermediate transfer method by which color images formed on the respective photoconductive drums 2Y, 2C, 2M, and 2K are superimposed one over another on the intermediate transfer belt 11, followed by transfer onto the transfer material (which is referred to as "second transfer). Alternatively, a direct transfer method by which images formed on the respective photoconductive drums 2Y, 2C, 2M, and 2K are directly transferred onto a transfer material for superimposition thereon may be used.

Figure 2:
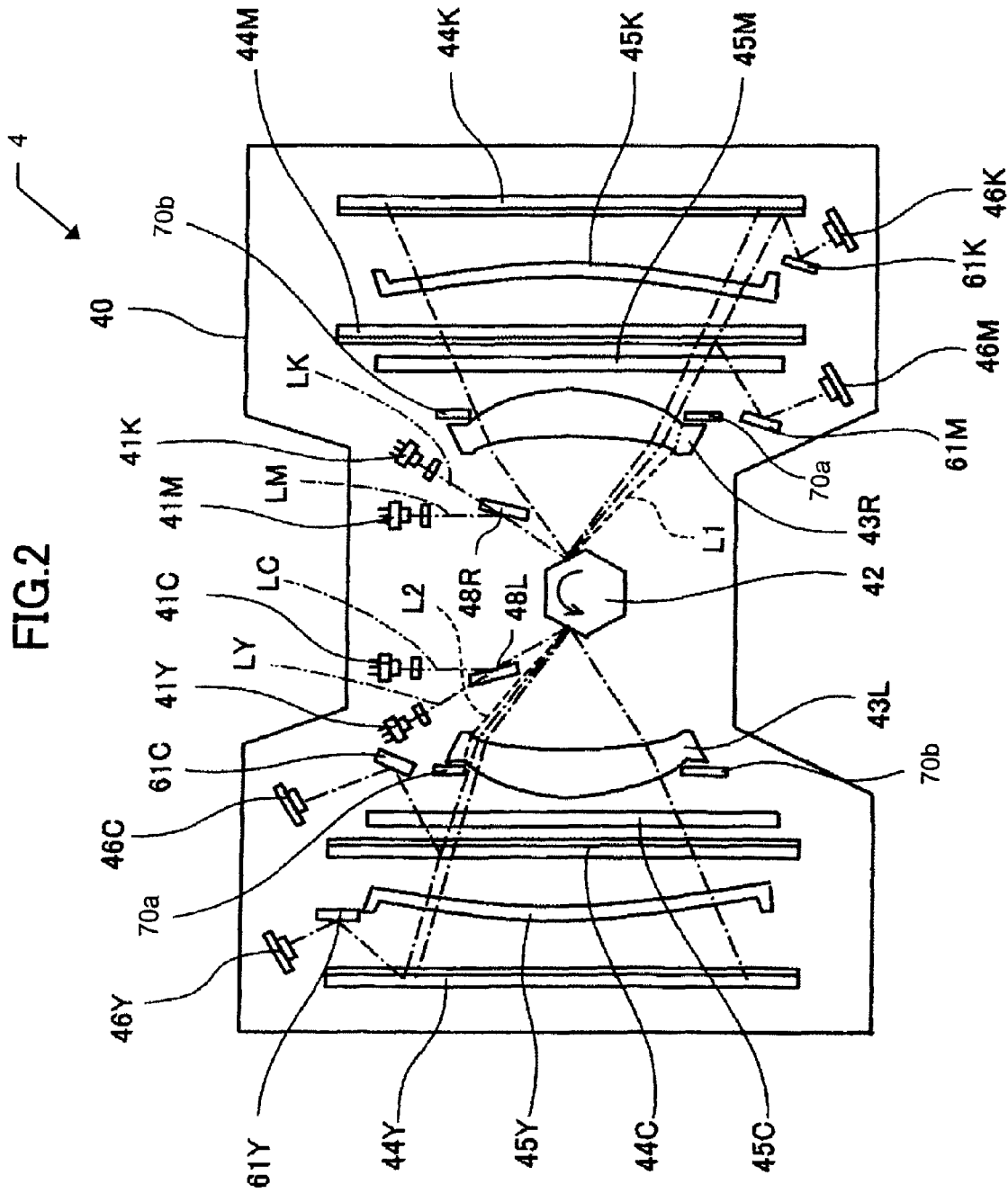
FIG. 2 is a plan view for explaining the internal structure of a first embodiment of the beam scanning device according to the present invention.
Figure 3:
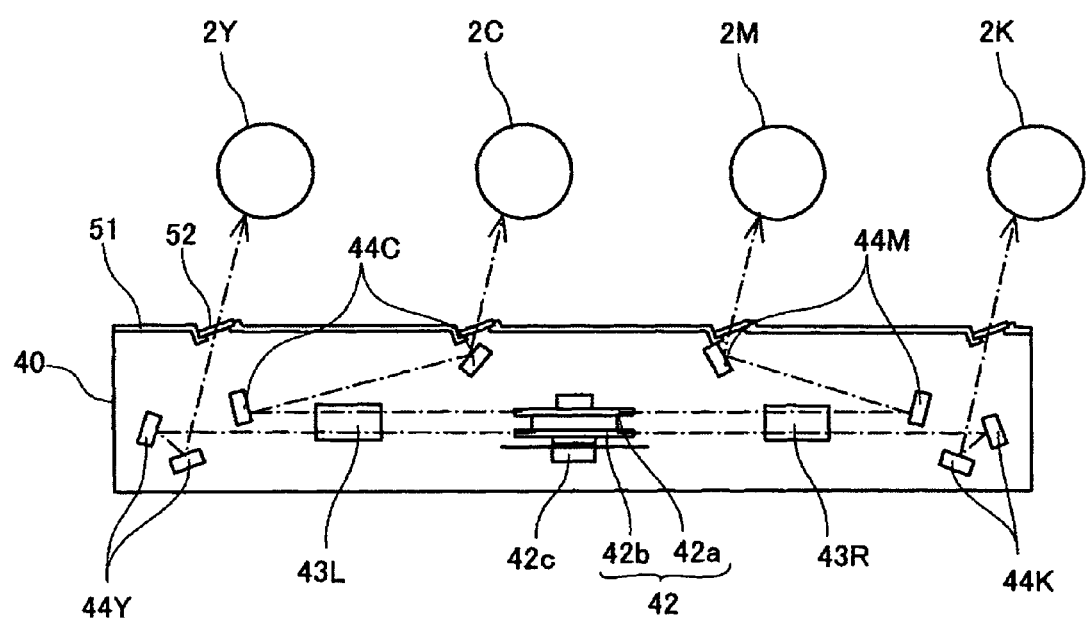
FIG. 3 is a lateral view of the beam scanning device.

In the following, the beam scanning device 4 according to a first embodiment of the present invention will be described with reference to FIG. 2 and FIG. 3. FIG. 2 is a plan view for explaining the internal structure of the beam scanning device. FIG. 3 is a lateral view of the beam scanning device.

The beam scanning device 4 includes, inside a metal housing 40, four laser units 41Y, 41M, 41C, and 41K serving as light sources for shining laser beams LY, LC, LM, LK on the respective photoconductive drums 2Y, 2C, 2M, and 2K. Two polygon mirrors 42a and 42b (which will be referred to as "polygon mirrors 42") are provided to serve as a beam deflecting unit to deflect and scan the laser beams from the laser units modulated in response to image signals, thereby forming two pairs of deflective scans on the two respective right/left sides, each pair being comprised of an upper part and a lower part. An fθ lens 43L and fθ lens 43R, which are arranged on the two respective sides, perform fθ correction so as to turn a constant angular velocity scan by the polygon mirrors 42 into a constant velocity scan on the photoconductive drums. Return mirrors 44Y, 44C, 44M, and 44k are further provided to reflect the two pairs of the laser beams scanned in the upper part and lower part. Surface-tilt correction lenses 45Y, 45C, 45M, and 45K are also provided to perform surface-tilt correction. Synchronization detecting sensors 46Y, 46C, 46M, and 46K are further provided to detect the timing at which the scanning of the laser beams start.

A polygon motor 42c rotates the polygon mirrors 42 at high speed. An aperture and cylindrical lens (not shown), from the side where the laser units are situated, are provided between the laser units and the polygon mirrors 42. The laser beams supplied from the four laser units are grouped into twos, i.e., the laser units 41Y and 41C on one hand and the laser units 41M and 41K on the other hand, which are incident to the polygon mirrors 42a and 42b from the opposite sides. This is generally referred to as an opposing scanning method. In order to direct the two laser beams LY and LC (or LM and LK) independently to the polygon mirrors 42 from one side thereof, a mirror 48L (or 48R) is provide on the optical path.

The laser beams deflected and scanned by the polygon mirrors 42 enter the fθ lenses after passing through soundproof glasses (not shown), and are then reflected by the return mirrors to be shone on the photoconductive drums. In this configuration, the angle of an incident beam to the surface of the photoconductive drum is set substantially equal between the colors Y, C, M and K.

Figure 4:
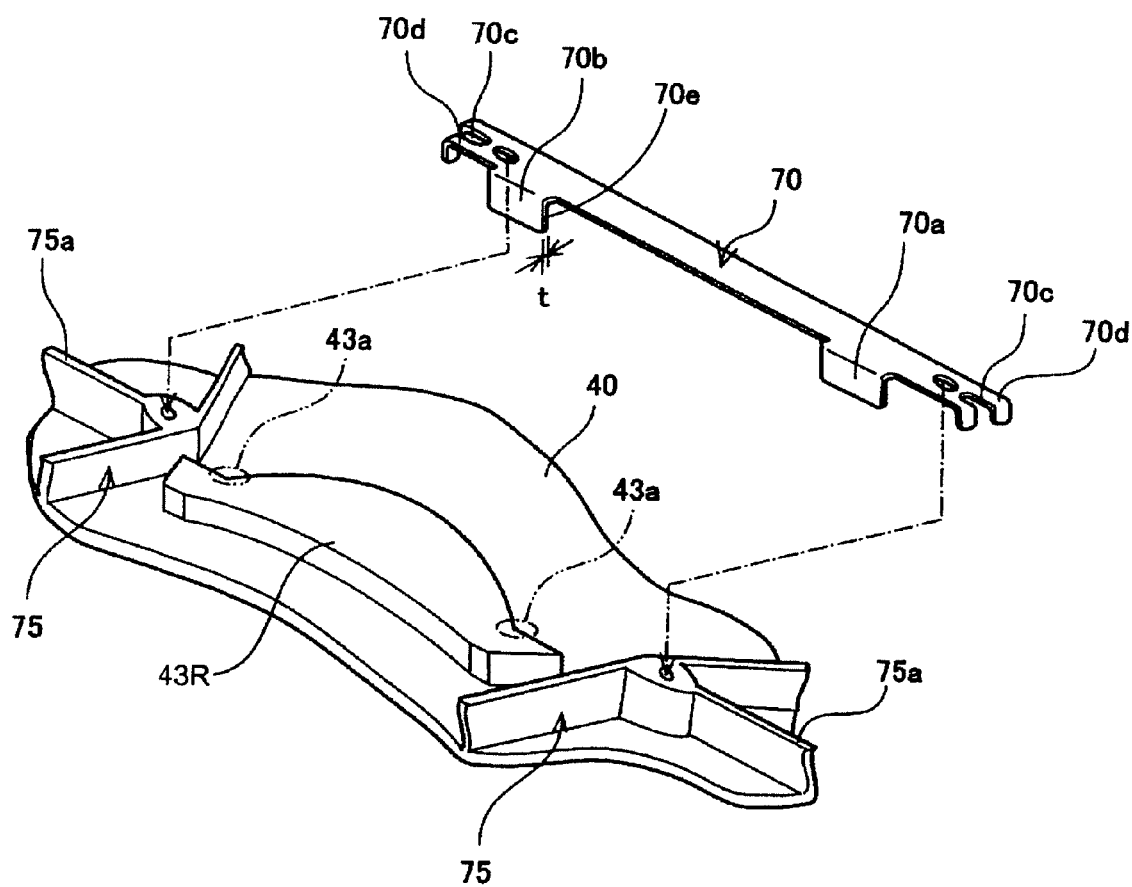
FIG. 4 is a perspective view for explaining a light blocking member of the beam scanning device.

The fθ lenses 43L and 43R are plastic lenses formed through plastic molding. Plastic lenses are molded by providing a large opening as a resin inlet (gate) outside the effective scan area for the purpose of securing good molding performance for the lens. Because of this, a discontinuous portion 43a comes into being at the border between the lens surface of the fθ lenses and the resin inlet (gate) as shown in FIG. 4.

The housing 40 of the beam scanning device 4 has a lid member 51. The lid member 51 is provided with dustproof glasses 52 at the beam outlet positions through which the beams are directed to the photoconductive drums, thereby preventing dust from entering the beam scanning device 4.

Synchronization detection for determining the start timing of writing operations is performed by the synchronization detecting sensors 46Y, 46M, 46C, and 46K, which receive the laser beams LY, LM, LC, and LK, respectively, after these beams pass through the fθ lenses and are reflected by synchronization-detection-purpose mirrors 61Y, 61M, 61C, and 61K, respectively. Each of the synchronization detecting sensors includes an electrical circuit substrate having an imaging lens and photoelectric device, and further includes a support member for supporting these.

The intended purpose of the synchronization detection is to establish correct timing of the scan beams. It thus suffices to provide the detectors at positions preceding the start of normal scans. In this embodiment, however, detecting units (synchronization detecting sensors) are also provided at positions following the normal scans in order to detect fluctuation of the speed (or time) of a scan. In this example, a single synchronization detecting sensor detects the upper and lower scan beams.

Figure 5:
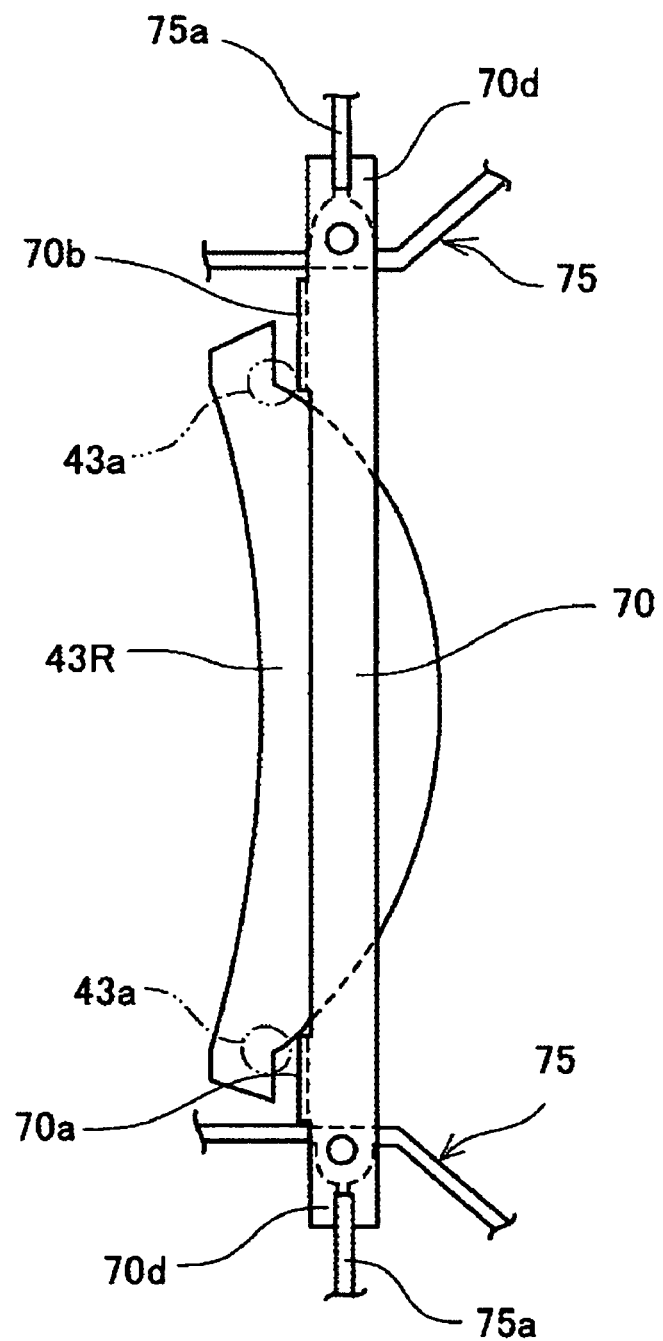
FIG. 5 is a plan view for explaining the light blocking member.

In the beam scanning device 4, the light beams pass through the fθ lenses 43L and 43R of the optical system, and are then blocked outside the effective scan area that includes the optical paths leading to the synchronization detecting sensors. To this end, light blocking members 70 are provided (see FIGS. 4 and 5 each having a light blocking unit 70a and a light blocking unit 70b (see FIGS. 2 and 4-6)

As can be seen from collectively reviewing FIG. 2 and FIG. 4 through FIG. 6, each of the light blocking members 70 includes a light blocking unit 70a and light blocking unit 70b to block the optical beam on the downstream side of the fθ lens outside the effective scan area that includes the synchronization-detection-purpose optical paths. The light blocking units 70a and 70b of the light blocking member 70 block flare light LF that is a synchronization-purpose pre-lit beam L1 (or L2) refracted at the discontinuous portion 43a of the fθ lens.

Figure 6:
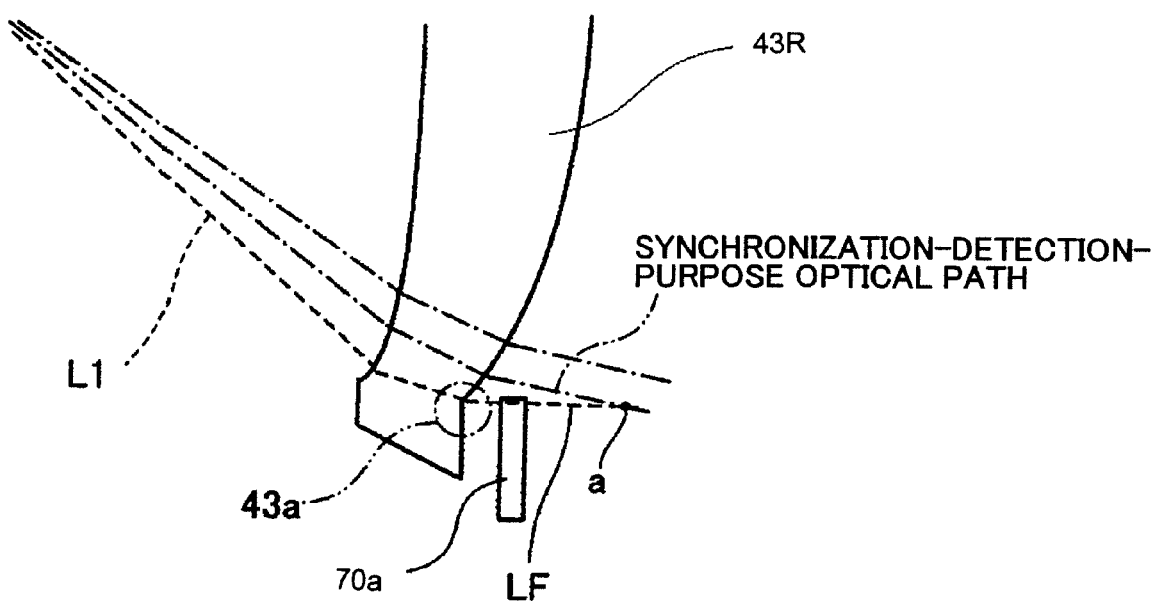
FIG. 6 is a drawing for explaining the light blocking member.

As shown in the enlarged, partial view of FIG. 6, the synchronization-purpose pre-lit beam L1 (or L2) shown in FIG. 2 is refracted by the fθ lens 43R to become the flare light LF, which intersects with the synchronization-detection-purpose optical path at position a. The light blocking unit 70a is situated at a position between the position a and the fθ lens 43R. Although not shown in FIG. 6, the light blocking unit 70b is situated in the same manner as light blocking unit 70a, but on the opposite end of the fθ lens 43R and with a position a that corresponds to the respective discontinuous portion 43a on the opposite end of the fθ lens 43R. The light blocking units 70a and 70b of the light blocking member 70 have such sufficient size as to block an unneeded portion of the synchronization-detection-purpose light on the upstream side and downstream side.

In this manner, the beam scanning device has a metal optical housing that exhibits high heat releasing performance and high anti-vibration performance, and is provided with a light blocking member for blocking the optical beams on the exit side of the fθ lenses outside the effective scan area that includes the synchronization-detection-purpose optical paths. With this provision, it is possible to block the flare light of synchronization-purpose pre-lit light with sufficient accuracy despite the use of the metal optical housing. This prevents image quality from degrading due to the flare light while ensuring good heat releasing performance and anti-vibration performance.

The light blocking member 70 is provided with the light blocking unit 70a for blocking the flare light outside the effective scan area on the upstream side of the scan path, and is also provided with the light blocking unit 70b outside the effective scan area on the downstream side of the scan path, thereby coping with a case in which the synchronization-purpose pre-lit light is turned on immediately after an end of the preceding scan line. That is, the blocking areas of the light blocking member is extended to cover all the areas outside the effective scan area on the upstream side and down stream side of the scan path. Provision is thus made to block the flare light with sufficient accuracy even when the synchronization-purpose pre-lit light is turned on immediately after the end of a preceding scan line.

The two light blocking portions (i.e., the light blocking units 70a and 70b) are part of the single light blocking member 70, and the same parts (light blocking units 70a and 70b) are situated symmetrically on the two sides. This makes it possible to reduce the number of assembly steps, thereby improving the efficiency of assembly work as well as reducing the cost.

Further, the same light blocking members are symmetrically situated on the two symmetrical sides. Namely, the same light blocking members 70 (i.e., having an identical design) are provided on the two respective sides where fθ lenses 43R and 43L are provided, respectively. This minimizes the number of components, and also minimizes the initial cost of metal-molding manufacturing and the unit price of components.

Further, the light blocking members 70 are made of an inexpensive metal plate member so as to achieve cost reduction. Alternatively, the light blocking members 70 may be manufactured as a resin molded product.

The light blocking members 70 are made of a plate having a thickness t of 1 mm (see FIG. 4) such that reflection on the surface of the light blocking units 70a and 70b does not cause the reflective light entering the imaging area to affect the image. Namely, an edge surface 70e perpendicular to the light blocking surface (i.e., the surface facing the fθ lens) of the light blocking units 70a and 70b is less than 2 mm in width, thereby avoiding a side effect of the flare light being reflected on the edge surface of the plate.

In order to suppress reflective light from the light blocking units 70a and 70b, the edge surface (side surface) of the light blocking units 70a and 70b, i.e., the edge surface 70e perpendicular to the light blocking surface, may preferably be colored in black so as to achieve a reflectivity of 20% or smaller, which is smaller than the reflectivity of the optical housing 40. With this provision, it is possible to reliably avoid a side effect of the flare light being reflected on the edge surface of the plate.

Further, it is necessary to avoid an accident during assembly such as damaging the fθ lenses located nearby when assembling the light blocking members 70. To this end, engaging members 70d are provided on the opposite ends of the light blocking member 70. Each of the engaging members 70d is comprised of a engaging groove 70c, which is to engage a rib 75a, which is part of a supporting member 75 formed on the housing 40. With this provision, the light blocking member 70 is positioned when it is assembled to the optical housing 40.

Figure 7:
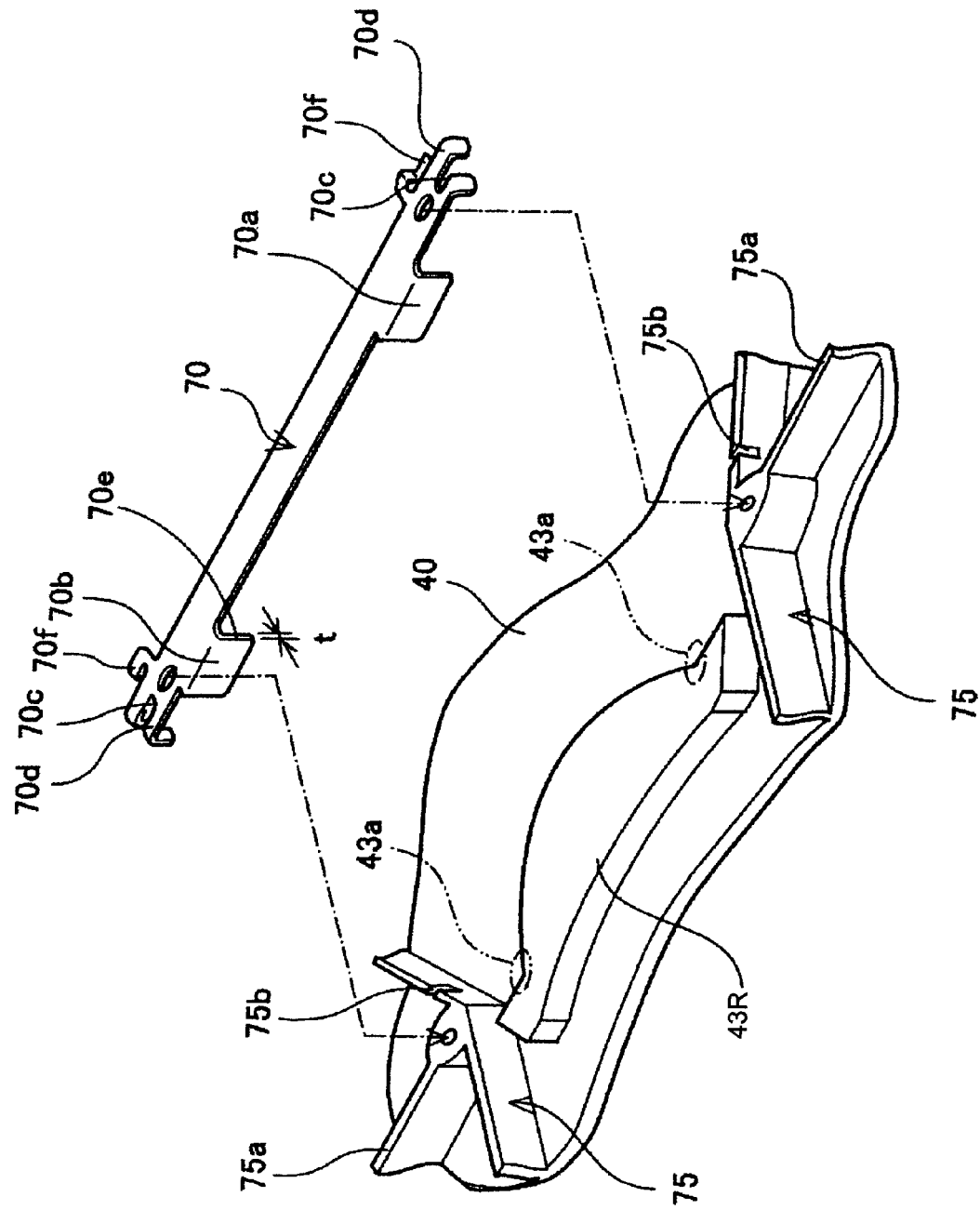
FIG. 7 is a perspective view for explaining another example of the light blocking member.

In this case, there may be a need to avoid the rotation of the light blocking member 70 associated with the rotation of a screw at the end of the process for assembling the light blocking member 70 to the optical housing 40. To this end, as shown in FIG. 7, for example, engaging tabs 70f may be formed as part of the light blocking member 70 while engaging grooves 75b are formed in the supporting member 75 of the optical housing 40. The engaging tabs 75f engage the engaging grooves 75b when the light blocking member 70 is assembled to the optical housing 40.

Figure 8:
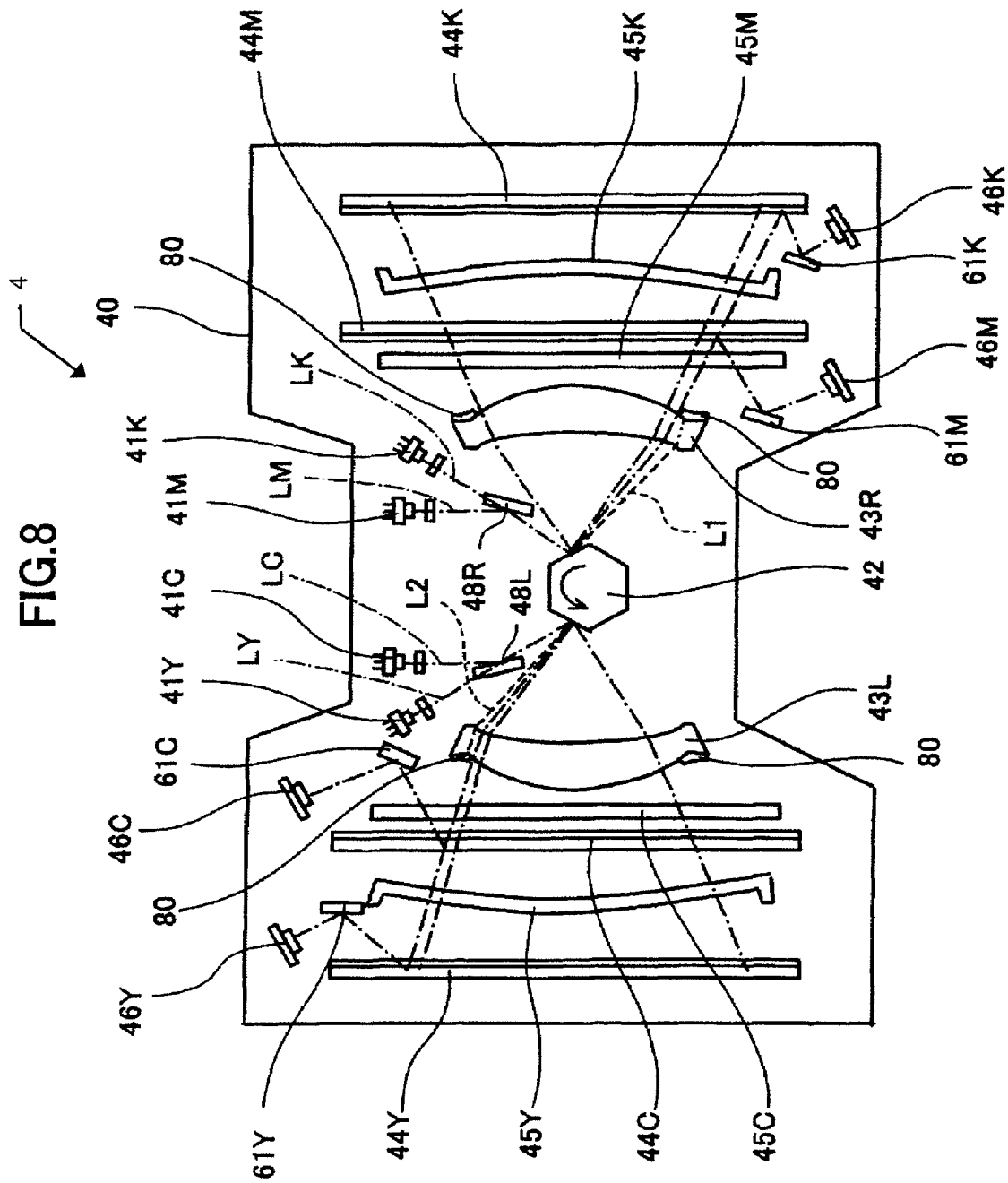
FIG. 8 is a plan view for explaining the internal structure of a second embodiment of the beam scanning device according to the present invention.

In the following, the beam scanning device 4 according to a second embodiment of the present invention will be described with reference to FIG. 8. FIG. 8 is a plan view for explaining the internal structure of the beam scanning device.

In the illustrated beam scanning device 4, the optical beams pass through the fθ lenses 43R and 43L of the optical system, and are then blocked by light blocking members 80 outside the effective scan area that includes the optical paths extending to the synchronization detecting sensors 46Y, 46C, 46M, and 46K. Structures other than the structure of the light blocking members are the same as those of the beam scanning device of the first embodiment, and a description thereof will be omitted.

Figure 9:
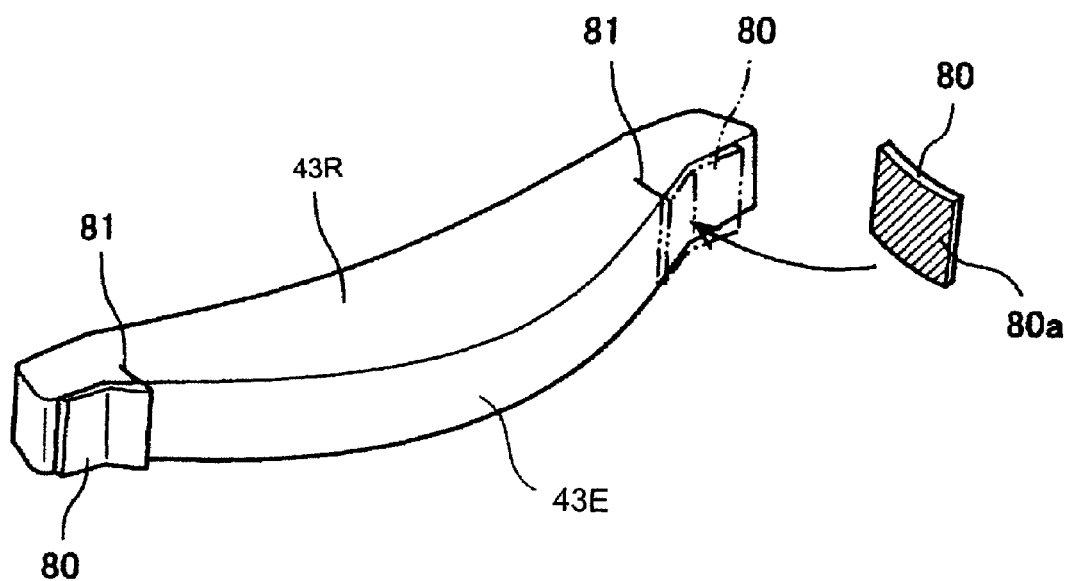
FIG. 9 is a perspective view for explaining the light blocking member of FIG. 8.
Figure 10:
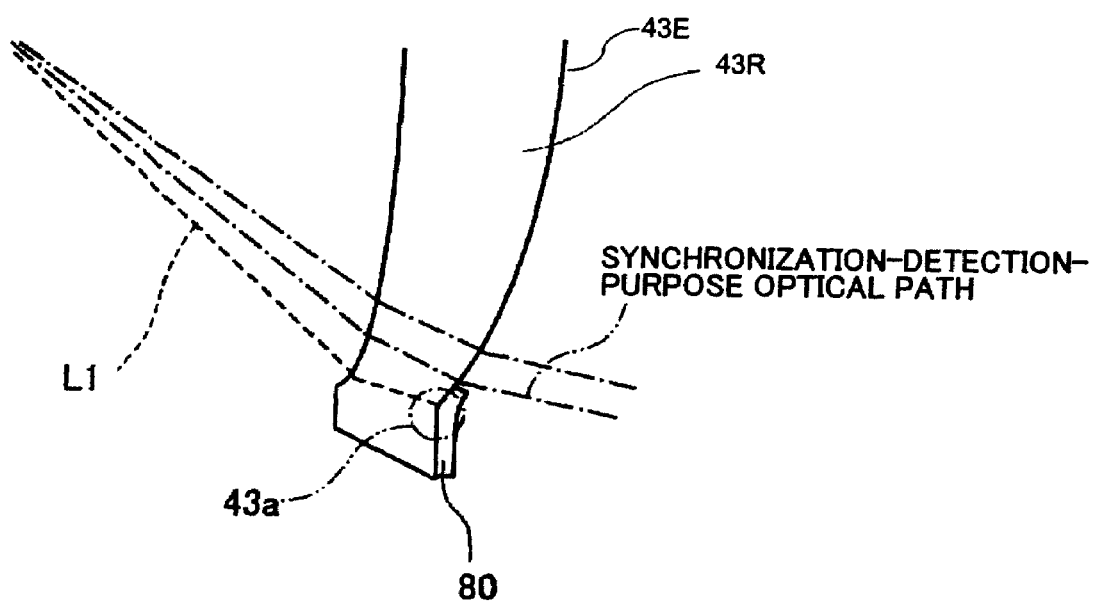
FIG. 10 is a drawing for explaining the light blocking member of FIG. 8.
Figure 11:
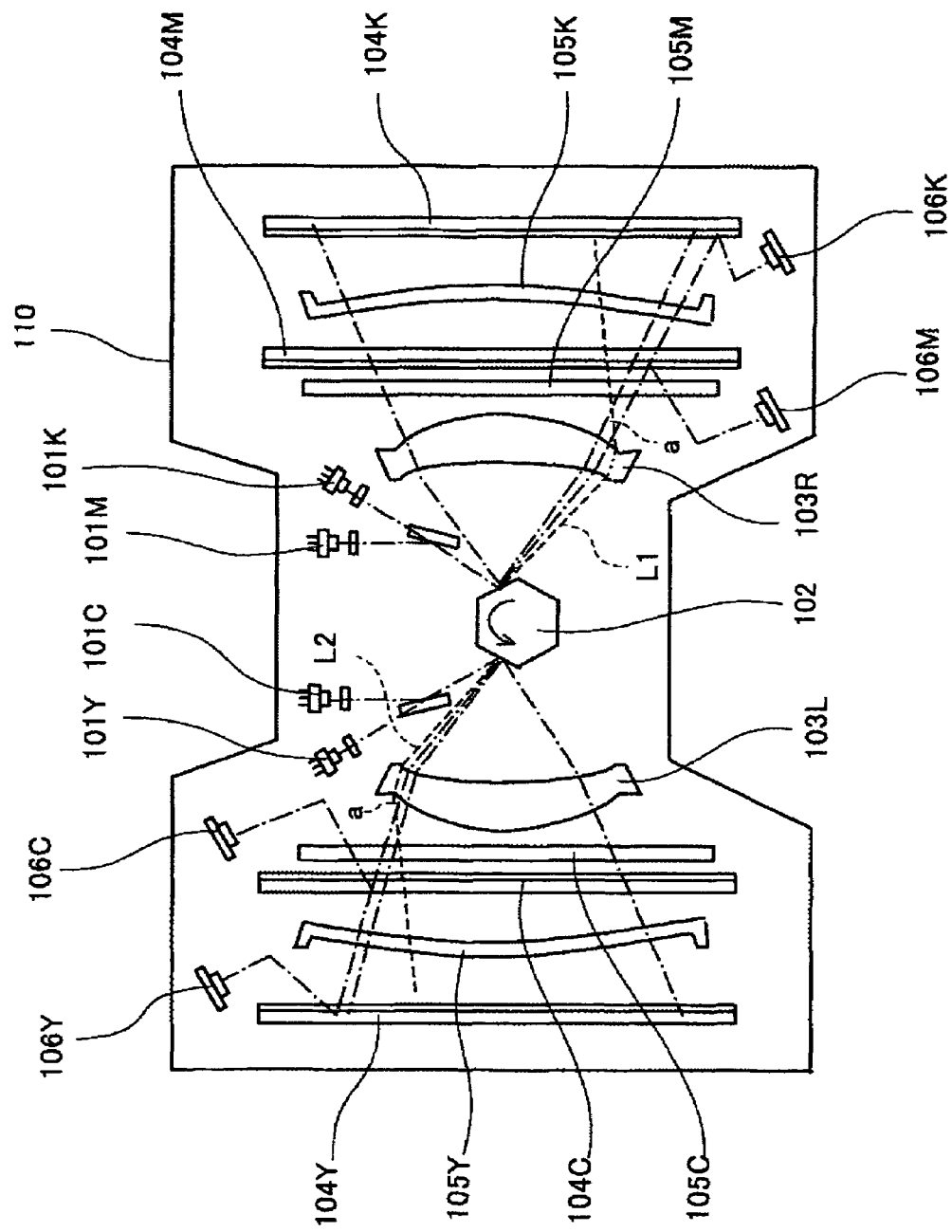
FIG. 11 is a plan view of a related-art beam scanning device.

As illustrated in FIG. 9 and FIG. 10, the light blocking members 80 are provided on an exit side 43E of the fθ lenses (lens 43R being shown in FIGS. 9 and 10 by way of example) to block an optical beam outside the effective scan area that include the synchronization-detection-purpose optical paths. The light blocking members 80 block the flare light that is created by the synchronization-detection-purpose pre-lit light L1 (L2) refracted by the discontinuous portion 43a of the fθ lens. The light blocking members 80 may be fittingly attached to the exit side surface 43E of the fθ lens around the discontinuous portion 43a with glue, two-sided tapes, or the like.

With the provision of the light blocking members 80 on the fθ lens 43, it is possible to block flare light such as the synchronization-detection-purpose pre-lit light with sufficient accuracy while using a metal optical housing. This prevents image quality from degrading due to the flare light while ensuring good heat releasing performance and anti-vibration performance.

A surface (light blocking surface) 80a of the light blocking member 80 that faces the fθ lens may preferably be colored in black so as to have a reflectivity of 20% or smaller. With this provision, it is possible to avoid a side effect that may be observed if the optical beam reflected on the light blocking surface 80a of the light blocking member 80 on the exit side of the fθ lens becomes flare light to irradiate the scanned surface.

Further, it is preferable to use a soft elastic material for the light blocking members 80 such as a film sheet, a urethane form material, or the like. This makes it possible to attach the light blocking members 80 fittingly to the curves of the exit surface of the fθ lens with the adhesiveness of the adhesive material, and also makes it possible to achieve cost reduction. The light blocking members 80 may be provided as part of a larger single sheet before they are cut out and attached to the fθ lens, which achieves further cost reduction.

Further, the fθ lens may be provided with attachment reference marks 81 for assisting the positioning of the light blocking members 80, as can be seen in FIG. 9. This improves the efficiency of work when attaching the light blocking members 80.

Further, the size of the light blocking members 80 is sufficient such that an unnecessary portion of the synchronization-detection-purpose light is also blocked on the upstream side of the scan path, as in the first embodiment where the light blocking units 70a and 70b are used. Moreover, the light blocking members 80 are provided outside the effective scan area on the upstream side of the scan path, and are also provided outside the effective scan area on the downstream side of the scan path, thereby coping with a case in which the synchronization-purpose pre-lit light is turned on immediately after the end of a preceding scan line.

In this embodiment, the fθ lenses 43R and 43L are provided at two respective locations, and the light blocking members 80 are provided on the upstream side and downstream side of the scan path for each lens. The light blocking members 80 provided at these four locations are the same components (i.e., components having an identical design), thereby avoiding complexity associated with an increase in the number of components. This minimizes the number of components, and also minimizes the initial cost of metal-molding manufacturing and the unit price of components.

The above embodiments have been described with respect to an example in which the beam scanning device and image forming apparatus of the present invention are those for color image formation. Notwithstanding this example, the present invention is equally applicable to a monochrome image forming apparatus and a beam scanning device used therein where there is only one optical system inclusive of a fθ lens and one light source.

Further, the present invention is not limited to these embodiments, but various variations and modifications may be made without departing from the scope of the present invention.

What is claimed is:

1. A beam scanning device, comprising:
   a light source to emit a light beam;
   an optical deflector to deflect the light beam;
   an optical system including a fθ lens to guide the defected light beam to a scan surface to form an image thereon;
   a synchronization detecting sensor to detect the deflected light beam outside an area of the image;
   a light blocking member configured to block the deflected light beam on an exit side of said fθ lens outside an effective scan area that includes the area of the image and also includes an optical path extending to said synchronization detecting sensor; and
   a metal housing accommodating said light source, said optical deflector, said optical system, said light blocking member, and said synchronization detecting sensor,
   wherein said light blocking member is separate from said fθ lens, and is configured to block the deflected light beam on the exit side of said fθ lens in a region that extends in a beam scan direction from a discontinuous point of said fθ lens to outside the effective scan area,
   wherein said light blocking member is a single integral piece made of a metal plate including:
      a first portion configured to block flare light of the light beam outside the effective scan area on an upstream side of a scan path of the light beam;
      a second portion configured to block flare light of the light beam outside the effective scan area on a downstream side of the scan path of the light beam; and
      engaging members provided on opposite ends of the metal plate to engage the metal housing, wherein the first portion and the second portion are two identical parts of the metal plate situated symmetrically on two sides, and are each situated at the exit side of the fθ lens and in close proximity to the fθ lens to extend outwards from the discontinuous point in the beam scan direction, wherein the metal plate further includes a connection plate configured to connect the first portion and the second portion and including the engaging members provided on opposite ends thereof, the first portion and the second portion being parts of the metal plate bent substantially at a right angle relative to the connection plate, and wherein, in an engaged position in which the light blocking member is attached to the housing, the connection plate is positioned above the fθ lens to extend substantially parallel to a side surface of the fθ lens, and the first portion and the second portion extend downward from the connection plate to block the flare light of the light beam passing through the fθ lens.

2. The beam scanning device as claimed in claim 1, wherein said fθ lens includes:
a lens portion corresponding to the effective scan area; and
a foreign shape portion outside the effective scan area.

3. The beam scanning device as claimed in claim 1, wherein said fθ lens is a plastic molding product.

4. The beam scanning device as claimed in claim 1, wherein said light blocking member blocks the deflected light beam in all areas other than the effective scan area on the upstream side and downstream side of the scan path of the light beam.

5. The beam scanning device as claimed in claim 1, wherein said light blocking member includes:
a light blocking surface; and
an edge surface perpendicular to said light blocking surface, said edge surface having a width of 2 mm or less.

6. The beam scanning device as claimed in claim 5, wherein said edge surface has a reflectivity smaller than a reflectivity of said metal housing.

7. The beam scanning device as claimed in claim 5, wherein said edge surface has a black color with a reflectivity of 20% or smaller.

8. The beam scanning device as claimed in claim 1, wherein said engaging members define a position of said light blocking member as assembled to said metal housing.

9. The beam scanning device as claimed in claim 1, further comprising in said metal housing:
one or more light sources to emit one or more light beams, each of which is deflected by said optical deflector and guided by said optical system to a corresponding scan surface to form a corresponding image thereon;
one or more synchronization detecting sensors each operable to detect a corresponding one of the one or more deflected light beams outside an area of the corresponding image; and
one or more additional light blocking members defining a plurality of light blocking members together with said light blocking member, said plurality of light blocking members configured to block a plurality of deflected light beams inclusive of the deflected light beam and the one or more deflected light beams.

10. The beam scanning device as claimed in claim 9, wherein at least two of said plurality of light blocking members have an identical design.

11. A beam scanning device, comprising:
a light source to emit a light beam;
an optical deflector to deflect the light beam;
an optical system including a fθ lens to guide the deflected light beam to a scan surface to form an image thereon;
a synchronization detecting sensor to detect the deflected light beam outside an area of the image;
a light blocking member configured to block the deflected light beam on an exit side of said fθ lens outside an effective scan area that includes the area of the image and also includes an optical path extending to said synchronization detecting sensor; and
a metal housing accommodating said light source, said optical deflector, said optical system, said light blocking member, and said synchronization detecting sensor,
wherein said light blocking member is separate from said fθ lens, and is configured to block the deflected light beam on the exit side of said fθ lens in a region that extends in a beam scan direction from a discontinuous point of said fθ lens to outside the effective scan area,
wherein said light blocking member includes a metal plate including:
a first portion configured to block flare light of the light beam outside the effective scan area on an upstream side of a scan path of the light beam;
a second portion configured to block flare light of the light beam outside the effective scan area on a downstream side of the scan path of the light beam; and
wherein the first portion and the second portion are each situated at the end side of the fθ lens and are attached to said fθ lens to extend outwards substantially from the discontinuous point in the beam scan direction,
wherein the metal plate further includes a connection plate configured to connect the first portion and the second portion and including the engaging members provided on opposite ends thereof, the first portion and the second portion being parts of the metal plate bent substantially at a right angle relative to the connection plate, and
wherein, in an engaged position in which the light blocking member is attached to the housing, the connection plate is positioned above the fθ lens to extend substantially parallel to a side surface of the fθ lens, and the first portion and the second portion extend downward from the connection plate to block the flare light of the light beam passing through the fθ lens.

12. The beam scanning device as claimed in claim 11, wherein said light blocking member is made of an elastic material.

13. The beam scanning device as claimed in claim 11, wherein said fθ lens has a reference mark thereon that indicates a position of said light blocking member.

14. The beam scanning device as claimed in claim 11, wherein said light blocking member has a surface that faces said fθ lens and that is black with a reflectivity of 20% or smaller.

15. The beam scanning device as claimed in claim 11, wherein the first portion and second portion of said light blocking member have a same shape.

16. The beam scanning device as claimed in claim 11, further comprising in said metal housing:
one or more light sources to emit one or more light beams, each of which is deflected by said optical deflector and guided by said optical system to a corresponding scan surface to form a corresponding image thereon;
one or more synchronization detecting sensors each operable to detect a corresponding one of the one or more deflected light beams outside an area of the corresponding image; and one or more additional light blocking members defining a plurality of light blocking members together with said light blocking member, said plurality of light blocking members configured to block a plurality of deflected light beams inclusive of the deflected light beam and the one or more deflected light beams.

17. The beam scanning device as claimed in claim 16, wherein at least two of said plurality of light blocking members have an identical design.

18. An image forming apparatus, comprising:
a beam scanning device comprising:
  a light source to emit a light beam;
  an optical deflector to deflect the light beam;
  an optical system including a fθ lens to guide the defected light beam to a scan surface to form an image thereon;
  a synchronization detecting sensor to detect the deflected light beam outside an area of the image;
  a light blocking member configured to block the deflected light beam on an exit side of said fθ lens outside an effective scan area that includes the area of the image and also includes an optical path extending to said synchronization detecting sensor; and
  a metal housing accommodating said light source, said optical deflector, said optical system, said light blocking member, and said synchronization detecting sensor,
  wherein said light blocking member is separate from said fθ lens, and is configured to block the deflected light beam on the exit side of said fθ lens in a region that extends in a beam scan direction from a discontinuous point of said fθ lens to outside the effective scan area,
  wherein said light blocking member is a single integral piece made of a metal plate including:
    a first portion configured to block flare light of the light beam outside the effective scan area on an upstream side of a scan path of the light beam;
    a second portion configured to block flare light of the light beam outside the effective scan area on a downstream side of the scan path of the light beam; and
    engaging members provided on opposite ends of the metal plate to engage the metal housing,
    wherein the first portion and the second portion are two identical parts of the metal plate situated symmetrically on two sides, and are each situated at the exit side of the fθ lens and in close proximity to the fθ lens to extend outwards from the discontinuous point in the beam scan direction;
an image carrier to carry the image thereon formed by said beam scanning device; and
a transfer unit to transfer the image from said image carrier to a sheet,
wherein the metal plate further includes a connection plate configured to connect the first portion and the second portion and including the engaging members provided on opposite ends thereof, the first portion and the second portion being parts of the metal plate bent substantially at a right angle relative to the connection plate, and
wherein, in an engaged position in which the light blocking member is attached to the housing, the connection plate is positioned above the fθ lens to extend substantially parallel to a side surface of the fθ lens, and the first portion and the second portion extend downward from the connection plate to block the flare light of the light beam passing through the fθ lens.

* * * * *